United States Patent
Fraij et al.

(10) Patent No.: US 8,726,788 B2
(45) Date of Patent: *May 20, 2014

(54) BEVERAGE MAKING UNIT FOR USE IN A PROCESS OF PREPARING A BEVERAGE ON THE BASIS OF AT LEAST TWO FLUIDS

(75) Inventors: Fred Fraij, Drachten (NL); Paulus Cornelis Duineveld, Drachten (NL); Marinus Christiaan Hansen, Odoornerveen (NL); Joeke Noordhuis, Hoogeveen (NL)

(73) Assignee: Koninklijke Philips N.V., Eindhoven (NL)

( * ) Notice: Subject to any disclaimer, the term of this patent is extended or adjusted under 35 U.S.C. 154(b) by 1410 days.

This patent is subject to a terminal disclaimer.

(21) Appl. No.: 12/088,840

(22) PCT Filed: Sep. 26, 2006

(86) PCT No.: PCT/IB2006/053500
§ 371 (c)(1),
(2), (4) Date: Mar. 31, 2008

(87) PCT Pub. No.: WO2007/036878
PCT Pub. Date: Apr. 5, 2007

(65) Prior Publication Data
US 2010/0005972 A1    Jan. 14, 2010

(30) Foreign Application Priority Data
Sep. 30, 2005   (EP) .................................. 05109049

(51) Int. Cl.
*A47J 31/00*   (2006.01)

(52) U.S. Cl.
USPC ................... 99/275; 99/279; 99/293; 99/300; 99/323.1

(58) Field of Classification Search
USPC .............. 99/275, 279, 323.3, 300, 293, 323.1
See application file for complete search history.

(56) References Cited

U.S. PATENT DOCUMENTS

| | | | |
|---|---|---|---|
| 5,339,725 A | 8/1994 | De'Longhi | |
| 6,183,800 B1 | 2/2001 | Van Straten | |
| 6,253,667 B1 * | 7/2001 | Lussi et al. | ...................... 99/455 |
| 6,713,110 B2 * | 3/2004 | Imboden et al. | .............. 426/511 |

FOREIGN PATENT DOCUMENTS

| | | |
|---|---|---|
| DE | 10033033 | 6/2002 |
| EP | 791321 | 8/1997 |
| EP | 803220 | 10/1997 |
| EP | 858757 | 8/1998 |
| EP | 1312292 | 5/2003 |
| EP | 1462041 | 9/2004 |

* cited by examiner

*Primary Examiner* — Reginald L Alexander (57) ABSTRACT

A disposable cartridge (10), which is suitable to be used in a process of preparing a beverage, comprises a beverage making unit (1). A duct system (30) of the beverage making unit (1) has a main duct (31), a first subsidiary duct (32) which merges into the main duct (31), and a second subsidiary duct (33) which merges into the main duct (31) as well, at a different position than the first subsidiary duct (32). In a process of preparing a beverage, a first fluid is supplied by the main duct (31), and flows of a second fluid are supplied by the subsidiary ducts (32, 33). In this way, it is achieved that the second fluid is mixed with the first fluid in two steps. In case the second fluid is used for heating the first fluid, local boiling of the first fluid is prevented.

5 Claims, 3 Drawing Sheets

BEVERAGE MAKING UNIT FOR USE IN A PROCESS OF PREPARING A BEVERAGE ON THE BASIS OF AT LEAST TWO FLUIDS

This application is a 35 U.S.C. 371 National stage of PCT/IB06/53500, filed Sep. 26, 2006, and claims priority on European Patent Application No. 05109049.6, filed Sep. 30, 2005.

The present invention relates to a method for preparing a beverage. In particular, the present invention relates to a method for preparing a beverage on the basis of at least two fluids, for example a method for preparing hot milk on the basis of milk and steam, or a method for preparing juice on the basis of syrup and water. In the state of the art, such a method is known, and comprises the steps of providing a main flow containing the first fluid and a subsidiary flow containing the second fluid; and letting the subsidiary flow containing the second fluid merge into the main flow containing the first fluid.

EP 0 858 757 A1 shows a device which is adapted to preparing hot milk on the basis of milk and steam according to the above-mentioned method. The device comprises a vacuum chamber and a milk feeder pipe which opens into the vacuum chamber, and which serves for supplying the milk during operation of the device. Furthermore, the device comprises a steam pipe which opens into the vacuum chamber as well, through a restricted end portion. During operation of the device, a flow of milk is obtained under the influence of a flow of steam, on the basis of a principle known as the venturi principle. In short, according to this venturi principle, a fluid is sucked in a chamber under the influence of a local underpressure that is obtained by successively conducting another fluid through a restriction and supplying this fluid to the chamber. An advantageous consequence of the application of the venturi principle in the device is that there is no need for applying a separate pump for causing a displacement of the milk.

In the vacuum chamber of the device, the milk and the steam are joined. In the process, the steam condenses in the milk, as a result of which the milk is heated. The quantity of the steam which is supplied to the vacuum chamber is chosen such as to be capable of heating the milk to a predetermined temperature, which may be close to a boiling point of the milk. In order to prevent steam from escaping from the device, it is necessary that all of the steam condenses in the milk.

A problem associated with the device known from EP 0 858 757 A1 and devices having a similar design is that local boiling of the milk occurs under the influence of the steam that is supplied, and that, as a consequence, the pumping action of the steam on the milk is decreased. It is an objective of the present invention to solve this problem.

The objective of the present invention is achieved by a method for preparing a beverage on the basis of at least a first fluid and a second fluid, comprising the steps of providing a main flow containing the first fluid and a first subsidiary flow containing the second fluid; letting the first subsidiary flow containing the second fluid merge into the main flow containing the first fluid; providing at least one additional subsidiary flow containing the second fluid; and letting the at least one additional subsidiary flow containing the second fluid merge into the main flow containing the first fluid as well; wherein the subsidiary flows containing the second fluid merge into the main flow containing the first fluid at different positions.

According to the present invention, at least two flows containing the second fluid are supplied to the flow containing the first fluid, wherein the flows containing the second fluid join the flow containing the first fluid at different positions. In this way, in case the second fluid is used for the purpose of heating the first fluid to a temperature close to its boiling point, local boiling of the first fluid is prevented, as the total quantity of the second fluid which is needed for the purpose of putting the first fluid to a predetermined temperature is supplied in at least two separate portions. Furthermore, more homogeneous heating of the first fluid is realized.

Another advantage of an application of the method according to the present invention is that the extent to which the first fluid and the second fluid get mixed is enhanced. As the second fluid is supplied to a flow containing the first fluid at several different positions, the second fluid is supplied to the flow containing the first fluid in a more even fashion. This is all the more true in case the subsidiary flows containing the second fluid merge into the flow containing the first fluid from different sides, for example from opposite sides, which is a feasible option within the scope of the present invention.

Advantageously, the subsidiary flows containing the second fluid merge into the main flow containing the first fluid at different positions along the main flow. For example, in case the second fluid is supplied in two subsidiary flows, namely a first subsidiary flow and a second subsidiary flow, it is preferred if the second subsidiary flow containing the second fluid merges into the main flow containing the first fluid at a position which is downstream with respect to a position at which the first subsidiary flow containing the second fluid merges into the main flow containing the first fluid. Especially in case of relatively small flows, wherein the second fluid has a function in heating the first fluid, local boiling of the first fluid is prevented by supplying the second fluid at different positions along the main flow containing the first fluid.

When the method according to the present invention is applied, it is also possible to obtain froth in the beverage that is prepared, namely by letting in air to at least one of the main flow containing the first fluid and the subsidiary flows containing the second fluid.

In principle, the method according to the present invention is applicable to any situation in which two fluids are joined for the purpose of preparing a beverage. It is possible that one of the fluids is also used as a pumping fluid for putting the other fluid in motion, wherein this may be realized in any suitable manner. For example, the pumping action may be obtained on the basis of the venturi principle, according to which a first fluid is sucked in a chamber under the influence of a local underpressure that is obtained by successively conducting a second fluid through a restriction and supplying this second fluid to the chamber. However, the pumping action may also be obtained on the basis of another principle, in particular a principle known as ejector principle, according to which a flow of a first fluid is generated under the influence of a local underpressure that is obtained by allowing for a transfer of momentum from a flow of a second fluid to the first fluid. It is also possible that the pumping action is obtained on the basis of a combination of the venturi principle and the ejector principle.

In particular, when the ejector principle is applied in the method according to the present invention, the main flow containing the first fluid is generated under the influence of at least one of the subsidiary flows containing the second fluid by creating a local underpressure, wherein this local underpressure is obtained by allowing for a transfer of momentum from the subsidiary flow containing the second fluid to the main flow containing the first fluid. Otherwise, when the venturi principle is applied in the method according to the present invention, the main flow containing the first fluid is generated under the influence of at least one of the subsidiary flows containing the second fluid by creating a local underpressure, wherein this local underpressure is obtained by restricting the subsidiary flow containing the second fluid prior to letting this flow merge into the main flow comprising the first fluid.

In a practical realization of carrying out the method according to the present invention, a duct system is provided, wherein the flows as mentioned take place in ducts of the duct system. The present invention also relates to a beverage making unit comprising such a duct system, wherein the beverage making unit is suitable for use in a beverage maker. It is noted that the ducts may be tubes, but may also be recesses in a surface of a suitable element, for example, which are covered by a foil sheet or other suitable covering means.

In a practical embodiment, the duct system comprises a main duct and at least two subsidiary ducts merging into the main duct, at different positions on the main duct. In view of the fact that the duct system provides a suitable environment for the method according to the present invention to take place, the main duct serves for conducting the main flow containing the first fluid, and the subsidiary ducts serve for conducting the subsidiary flows containing the second fluid. Advantageously, the subsidiary ducts merge into the main duct at different sides of the main duct and/or at different positions along a longitudinal axis of the main duct.

Preferably, the configuration of the ducts of the duct system is such that it is possible for at least one of the subsidiary flows containing the second fluid to perform a pumping action on the main flow containing the first fluid. In a duct system which is adapted to letting such a pumping action take place on the basis of the ejector principle, a longitudinal axis of at least one of the subsidiary ducts extends at an angle smaller than 90° with respect to a longitudinal axis of the main duct at the position where the subsidiary duct merges into the main duct, and a portion of the main duct extending between this position and an outlet of the duct system has a constant cross-sectional area over its length. Otherwise, in a duct system which is adapted to letting the pumping action take place on the basis of the venturi principle, an end portion of at least one of the subsidiary ducts, through which this subsidiary duct is connected to the main duct, is restricted, and a portion of the main duct, into which this subsidiary duct merges, is widened.

A feasible application of the method according to the present invention is an application for the purpose of preparing hot milk. Preferably, for the purpose of such an application, the first fluid comprises milk, and the second fluid comprises steam. In principle, it is also possible that the first fluid comprises another liquid than milk. For the purpose of heating the liquid, the second fluid does not necessarily need to comprise steam. For example, it is also possible that the second fluid comprises hot water.

Especially in case the first fluid comprises a liquid such as milk and the second fluid comprises steam, it is preferred if a cross-sectional area of the subsidiary ducts is smaller than a cross-sectional area of the main duct, because in that way, good pumping results are obtained.

It is noted that it is possible to apply two or more beverage making units according to the present invention arranged in series.

Besides a main duct and subsidiary ducts merging into the main duct, the duct system of the beverage making unit according to the present invention may comprise at least one supply duct which is connected to at least two subsidiary ducts. During operation of the beverage making unit, the supply duct serves for conveying a fluid and supplying this fluid to all subsidiary ducts connected to it. In this way, the application of a supply duct facilitates a process of providing at least two subsidiary ducts with the same fluid.

Preferably, the beverage making unit according to the present invention, i.e. the beverage making unit having a duct system which is adapted to conveying at least two fluids and joining the fluids in a manner which is in accordance with the method according to the present invention, is part of a disposable cartridge for use in a beverage maker.

In general, disposable cartridges are meant to be thrown away by a user after one use or a limited number of uses. Furthermore, disposable cartridges are adapted to being connected to fixedly arranged elements of the beverage maker. In particular, inlets of the beverage making unit of a disposable cartridge are connectable to ducts in the beverage maker for supplying the required fluids.

An important advantage of the application of disposable cartridges is that it is possible to keep the interior of a beverage maker from getting contaminated, wherein there is no need for the user to clean the interior of the beverage maker every time the beverage maker has been used. Another advantage of the application of disposable cartridges is related to the fact that disposable cartridges are easy to use. In particular, when disposable cartridges are applied, preparations of a process of making a beverage only involve placing a cartridge in a beverage maker. Furthermore, a user does not need to dose one or more ingredients of the beverage, as the disposable cartridges may contain the right amount of these ingredients. Yet another advantage of the application of disposable cartridges is that a higher reliability of the operation of the beverage maker is achieved, as malfunctioning of the beverage maker due to contamination of the beverage making unit does not occur.

Advantageously, in case the disposable cartridge comprising the beverage making unit according to the present invention is suitable to be used in a process of preparing a hot liquid on the basis of the liquid and steam, the cartridge comprises at least two inlets for letting in steam to the duct system of the beverage making unit. That does not alter the fact that the cartridge may have only one inlet for letting in steam, wherein one inlet duct branches off into at least two ducts inside the cartridge, so that the steam may still be supplied to the liquid at different positions.

In a feasible embodiment, the disposable cartridge comprises at least one reservoir containing a liquid. Within the scope of the present invention, this reservoir may be refillable. In such a case, the cartridge may be used several times. However, in case the disposable cartridge is only intended for single use, there is no need for the reservoir to be refillable.

The present invention also relates to a beverage maker. According to a first option, a beverage making unit as described in the foregoing, which comprises a duct system adapted to conveying at least a first fluid and a second fluid, and to supplying the second fluid at two positions or even more positions to a flow containing the first fluid, is an integral part of the beverage maker. In a preferred embodiment, the beverage maker comprises means for supplying a fluid, wherein these means are connected to at least two inlets of the duct system of the beverage making unit. Such means may for example comprise a steam generator which is adapted to supplying steam.

According to a second option, the beverage maker comprises a space for receiving a disposable cartridge as described in the foregoing. In that case, the beverage maker may also comprise means for supplying a fluid, such as a steam generator. Preferably, in that case, these means are connectable to at least two inlets of the duct system of the beverage making unit of the disposable cartridge upon receipt of the disposable cartridge in the space.

Basically, the present invention relates to a method for preparing a beverage on the basis of at least a first fluid and a second fluid, comprising the steps of providing a main flow containing the first fluid and a first subsidiary flow containing the second fluid; letting the first subsidiary flow containing the second fluid merge into the main flow containing the first fluid; providing at least one additional subsidiary flow containing the second fluid; and letting the at least one additional subsidiary flow containing the second fluid merge into the main flow containing the first fluid as well; wherein the subsidiary flows containing the second fluid merge into the main flow containing the first fluid at different positions.

The second fluid may be used to heat the first fluid to a temperature which is close to the boiling point of the first fluid. In that case, due to the fact that according to the present invention, the second fluid is supplied to the first fluid in at least two portions, local boiling is prevented. Furthermore, the present invention offers a practical possibility of obtaining a homogeneous mixture of the fluids in a relatively simple and fast manner, as a process of mixing the fluids is performed in at least two steps.

In a preferred way of carrying out the method according to the present invention, at least one of the subsidiary flows containing the second fluid is used for the purpose of pumping the first fluid.

The applied fluids may be a liquid, a gas or a combination of a liquid and a gas. In case the fluid is a liquid, solid particles or polymers may be added to the fluid. In principle, the number of applied fluids is not limited.

The present invention will now be explained in greater detail with reference to the figures, in which similar parts are indicated by the same reference signs, and in which.

Figure 1:
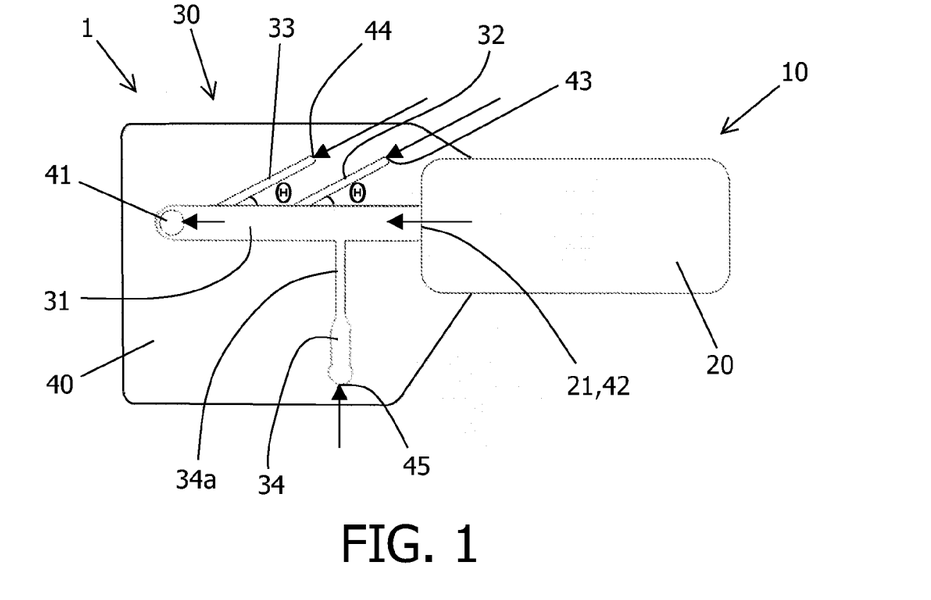
FIG. 1 diagrammatically shows a disposable cartridge for use in a beverage maker, comprising a beverage making unit according to a first preferred embodiment of the present invention.

FIG. 1 diagrammatically shows a disposable cartridge 10 for use in a beverage maker, comprising a beverage making unit 1 according to a first preferred embodiment of the present invention. The disposable cartridge 10 as shown is intended for single use, in other words, it is only possible to use the cartridge 10 one time in a process of preparing a beverage. After the cartridge 10 has been applied one time, it is no longer useful, and it is only fit to be thrown away.

Figure 2:
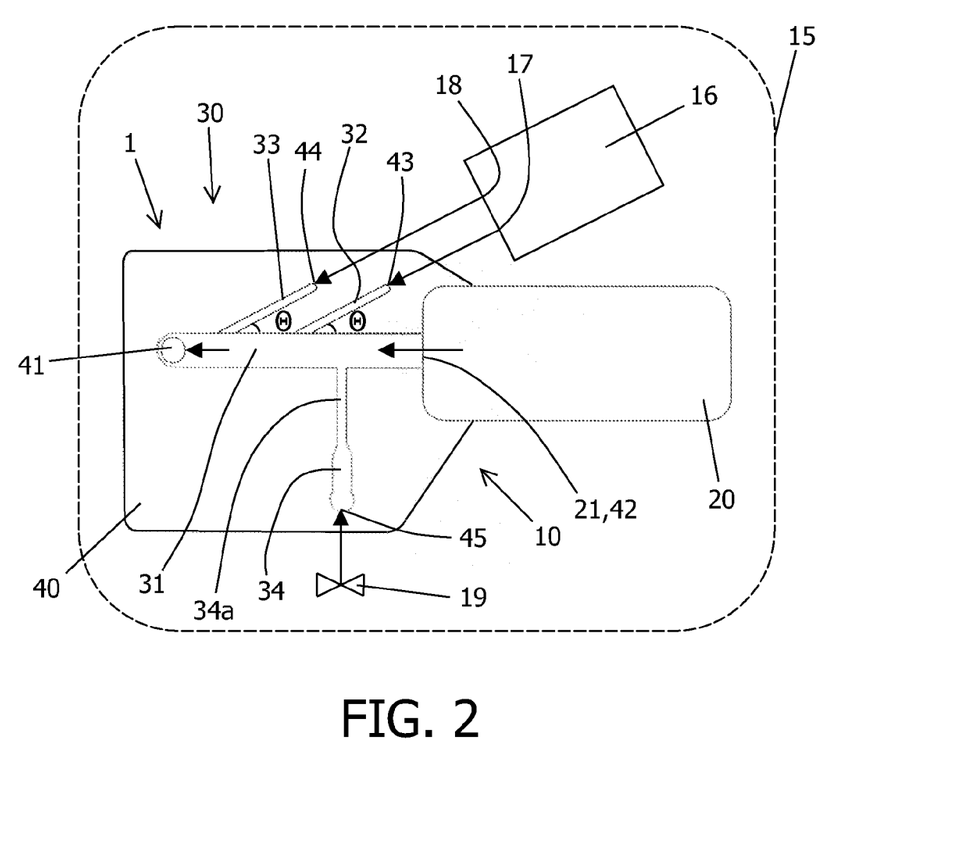
FIG. 2 diagrammatically shows components of a beverage maker and the disposable cartridge shown in FIG. 1, wherein the disposable cartridge is placed in the beverage maker, and wherein the disposable cartridge is connected to components of the beverage maker.

FIG. 2 diagrammatically shows the disposable cartridge 10 and components of a beverage maker 15, wherein the disposable cartridge 10 is placed in the beverage maker 15, and wherein the disposable cartridge 10 is connected to components of the beverage maker 15. In FIG. 2, the beverage maker 15 in general is represented by a rectangle of dashed lines.

Besides the beverage making unit 1, the disposable cartridge 10 comprises a reservoir 20 containing a liquid, for example milk or liquid coffee extract. In the shown example, the reservoir 20 is shaped as an elongated sealed pouch, which may be manufactured by providing two foil sheets and interconnecting these foil sheets along their peripheries. That does not alter the fact that the reservoir 20 may be realized in another suitable way, for example as a recess in a surface of an element of the disposable cartridge 10, wherein the recess is covered by a foil sheet.

The beverage making unit 1 of the disposable cartridge 10 comprises a duct system 30. In the first preferred embodiment as shown, the duct system 30 comprises four ducts. A main duct 31 extends between an outlet 21 of the reservoir 20 and an outlet 41 of the beverage making unit 1. In the following, an end of the main duct 31 which is connected to the outlet 21 of the reservoir 20 will be referred to as liquid inlet 42 of the duct system 30. In the shown example, the main duct 31 is shaped as a straight duct having a constant cross-sectional area over its length.

Two subsidiary ducts 32, 33 merge into the main duct 31, at positions between the liquid inlet 42 of the duct system 30 and the outlet 41 of the beverage making unit 1. The subsidiary ducts 32, 33 are arranged at a distance with respect to each other, wherein the subsidiary ducts 32, 33 merge into the main duct 31 at different positions along a longitudinal axis of the main duct 31. In particular, a position where a first subsidiary duct 32 merges into the main duct 31 is closer to the liquid inlet 42 of the duct system 30 than a position where a second subsidiary duct 33 merges into the main duct 31. In the shown example, the subsidiary ducts 32, 33 extend substantially parallel with respect to each other.

The duct system 30 comprises an air duct 34 which merges into the main duct 31, at a position between the liquid inlet 42 and the subsidiary duct 32 which is closest to the liquid inlet 42. In the shown example, a portion 34a of the air duct 34 that is linked to the main duct 31 is narrowed.

According to a practical possibility, the ducts 31-34 are formed as recesses in a body 40 of the disposable cartridge 10. The recesses are covered by suitable means (not shown) for closing a top side of the recesses. An example of suitable closing means is a foil sheet. It is noted that the ducts 31-34 do not necessarily need to comprise recesses and closing means, as long as the ducts 31-34 are capable of conveying fluids. For example, the ducts 31-34 might as well comprise tubes. However, it is advantageous to have recesses and foil sheets for covering the recesses, as a manufacturing process of such an arrangement may be easier than a process of assembling a number of tubes, given the fact that the body 40 may be formed by using injection moulding techniques.

Within the scope of the present invention, the shape of a cross-section of the ducts 31-34 of the duct system 30 may be any suitable shape. For example, the cross-section may be circular, rectangular, square or hexagonal. An advantage of a circular cross-section is that a relatively low flow resistance of the duct 31-34 is obtained.

The air duct 34 is at right angles to the main duct 31. That does not alter the fact that an angle between the air duct 34 and the main duct 31 may have any suitable value. An angle θ between a portion of the main duct 31 that is linked to the reservoir 20 and each of the subsidiary ducts 32, 33 is smaller than 90°. In the shown example, the angle θ is approximately 30°.

The disposable cartridge 10 is suitable to be applied for preparing a hot beverage such as hot milk or coffee. According to a practical possibility, during a process of preparing a beverage in which the disposable cartridge 10 is applied, the hot beverage is obtained by heating liquid initially contained by the reservoir 20 by means of steam. Therefore, the beverage maker 15 for receiving and operating the disposable cartridge 10 comprises a steam generator 16. In FIG. 2, it is shown that when the disposable cartridge 10 is placed in the beverage maker 15, each of the subsidiary ducts 32, 33 is connected to a steam socket 17, 18 of the steam generator 16. In the following, an end of the first subsidiary duct 32 which is connected to a first steam socket 17 of the steam generator 16 when the disposable cartridge 10 is placed in the beverage maker 15 will be referred to as first steam inlet 43 of the duct system 30, and an end of the second subsidiary duct 33 which is connected to a second steam socket 18 of the steam generator 16 when the disposable cartridge 10 is placed in the beverage maker 15 will be referred to as second steam inlet 44 of the duct system 30.

Furthermore, in FIG. 2, it is shown that the beverage maker 15 comprises a valve 19, and that the air duct 34 is connected to the valve 19 when the disposable cartridge 10 is put in place in the beverage maker 15. By operating the valve 19, a user of the beverage maker 15 has a possibility of closing the air duct 34, and letting the beverage maker 15 perform a process of preparing a beverage by only using the main duct 31 and the subsidiary ducts 32, 33. Within the scope of the present invention, it is not necessary that the air duct 34 is closable. Furthermore, in case means such as a valve 19 for giving the user an opportunity of closing the air duct 34 are provided, it is not necessary that such means are arranged in the beverage maker 15. Alternatively, such means may also be arranged in the disposable cartridge 10, although this is not a preferred option, in view of the fact that the cartridge 10 is only intended for single use.

In a process of preparing a beverage, in which the disposable cartridge 10 is applied, the air duct 34 serves for letting in air to the main duct 31 in case the valve 19 is in an opened position. In the following, an end of the air duct 34 which is connected to the valve 19 when the disposable cartridge 10 is placed in the beverage maker 15 will be referred to as air inlet 45 of the duct system 30. When the valve 19 is put to an opened position, air is supplied to the beverage, so that froth is obtained. However, when the valve 19 is put to a closed position, there will be no formation of froth in the beverage. Hence, by operating the valve 19, the user has a possibility of choosing whether to have a frothed beverage, or not.

In order to improve froth quality and volume, obstructions (not shown) may be applied, which are arranged in a portion of the main duct 31 extending between the connection to the air duct 34 and the outlet 41 of the beverage making unit 1. By applying such obstructions, frothing of the liquid is enhanced, as the obstructions increase flow resistance and/or create some extra agitation. Advantageously, at least a number of obstructions are arranged in a circle around the outlet 41 of the beverage making unit 1.

In the following, a process of preparing a beverage, in which the disposable cartridge 10 and the beverage maker 15 are applied, will be described. For sake of clarity, directions of incoming flows and an outgoing flow are indicated by means of arrows in FIGS. 1 and 2.

Preparations of the process of preparing a beverage comprise the step of placing the disposable cartridge 10 in the beverage maker 15, and placing a receptacle such as a cup or the like underneath the outlet 41 of the beverage making unit 1 of the cartridge 10. In the process of putting the disposable cartridge 10 in the right place in the beverage maker 15, connections are established between the steam sockets 17, 18 of the steam generator 16 of the beverage maker 15 and the steam inlets 43, 44 of the duct system 30 of the beverage making unit 1 of the cartridge 10, and between the valve 19 of the beverage maker 15 and the air inlet 45 of the duct system 30.

When the process of preparing the beverage is started, it is important that a liquid is allowed to flow from the reservoir 20 to the main duct 31, through the liquid inlet 42 of the main duct 31. Therefore, suitable means (not shown) are applied for piercing the foil of the reservoir 20 at an appropriate position. For example, such means may comprise a movably arranged pin.

Depending on input provided by the user, the valve 19 is in the opened position or in the closed position. In the following, a process for preparing a beverage in which the valve 19 is in the opened position, i.e. a process for preparing a frothed beverage, will be described.

The actual process of preparing the beverage starts when the liquid is present in the main duct 31 and the steam generator 16 is in operation, wherein steam enters the first subsidiary duct 32 through the first steam inlet 43. At the other end of the first subsidiary duct 32, i.e. the end where the first subsidiary duct 32 merges into the main duct 31, momentum is transferred from the flow of steam to the liquid, as a result of which a local underpressure is obtained. Under the influence of this local underpressure, the liquid is drawn out of the reservoir 20, wherein a flow of the liquid which is directed toward the outlet 41 of the beverage making unit 1 is generated. Hence, the steam that is supplied through the first subsidiary duct 32 performs a pumping action on the liquid, on the basis of a principle which is referred to as the ejector principle. In a similar fashion, steam enters the second subsidiary duct 33 through the second steam inlet 44, and a flow of this steam performs a pumping action on the liquid as well. In the process, the steam condenses in the liquid, so that the liquid is heated, and more underpressure is generated. Furthermore, air is sucked in the main duct 31, through the air duct 34, and gets entrained in the flow of the liquid and the condensed steam. In this way, a hot frothed beverage is obtained, which exits the beverage making unit 1 through the outlet 41.

A ratio between an obtained flow rate of the liquid and a flow rate of the steam is related to a ratio between a cross-sectional area of the main duct 31 and a cross-sectional area of the first subsidiary duct 32 and the second subsidiary duct 33, respectively. For a given flow rate of the steam, the obtained flow rate of the liquid increases when the cross-sectional area of the subsidiary ducts 32, 33 is decreased with respect to the cross-sectional area of the main duct 31. Hence, it is a preferred option to have a beverage making unit 1 in which a cross-sectional area of the subsidiary ducts 32, 33 is smaller than a cross-sectional area of the main duct 31.

Within the scope of the present invention, it is possible that measures are applied for the purpose of locally restricting the flow of the liquid. For example, a portion of the main duct 31 may be narrowed, or obstacles may be arranged in this duct 31. In this way, a possibility of adapting a flow rate of the liquid is obtained. Within the scope of the present invention, the extent to which the flow of the liquid is locally restricted may be adjustable. As the liquid is heated by the steam, it is advantageous to have a possibility of controlling the flow rate of the liquid, as in this way, a possibility of controlling the resulting temperature of the mixture that is obtained on the basis of the liquid and the steam is created. In general, the resulting temperature of the mixture increases when the restriction to the flow of the liquid increases.

During operation of the beverage making unit 1, the steam is applied for the purpose of pumping the liquid from the reservoir 20 to the outlet 41, wherein a flow of the liquid is obtained under the influence of the flows of the steam. The pumping process is performed in two steps, wherein a first step takes place at a joint of the first subsidiary duct 32 to the main duct 31, under the influence of the flow of steam supplied by the first subsidiary duct 32, and wherein a second step takes place at a joint of the second subsidiary duct 33 to the main duct 31, under the influence of the flow of steam supplied by the second subsidiary duct 33. Additionally, condensation of the steam in the liquid takes place, as a result of which the liquid is heated. In order to obtain a beverage at a temperature that is appreciated by a user of the beverage maker 15, the liquid is heated to a temperature that is close to the boiling temperature of the liquid.

In order to have a good pumping action, it is important that the angle θ between the main duct 31 and each of the subsidiary ducts 32, 33 is smaller than 90°. In case the angle θ would be 90°, the flows of the steam would practically not lead to a flow of the liquid in the main duct 31, as in that case, the steam would not have a momentum in a direction in which motion of the liquid is allowed, i.e. a direction in which the longitudinal axis of the main duct 31 extends. In case the angle θ would be larger than 90°, the influence of the flows of the steam on the liquid in the main duct 31 would only cause the liquid to flow backward, i.e. in a direction toward the reservoir 20. When the liquid is milk, a good performance of the beverage making unit 1 is obtained when the angle θ between the main duct 31 and each of the subsidiary ducts 32, 33 is about 25°.

By supplying the steam that is generated by the steam generator 16 of the beverage maker 15 to the main duct 31 in two portions, a good distribution of the steam in the liquid is achieved, and local boiling of the liquid is prevented. The latter is important, as a pumping performance of the beverage making unit 1 is decreased in case local boiling would occur. If the steam is supplied at one position, through one subsidiary duct, local boiling of the liquid is practically inevitable, as the quantity of the steam that is supplied is sufficient to heating the liquid to a temperature that is near its boiling temperature, and the steam is not evenly distributed throughout the liquid all at once. By applying at least two ducts 32, 33 for supplying the steam, the temperature of the liquid is gradually increased. In this way, it is even possible to put the liquid to a temperature that is very close to its boiling temperature, without any risk of local boiling of the liquid. Furthermore, undesirable escape of steam from the duct system 30 does not occur.

In the shown example, the duct system 30 of the beverage making unit 1 comprises two subsidiary ducts 32, 33 for supplying steam to the main duct 31. However, within the scope of the present invention, the duct system 30 may comprise more than two subsidiary ducts for supplying the steam. For example, the duct system 30 may comprise four subsidiary ducts, wherein the subsidiary ducts are arranged at different positions along a longitudinal axis of the main duct 31, and wherein subsequent subsidiary ducts merge into the main duct 31 at opposite sides of the main duct 31.

It is not necessary that the steam generator 16 of the beverage maker 15 comprises two steam sockets 17, 18, and that the duct system 30 comprises two steam inlets 43, 44. It is also possible that the steam generator 16 comprises only one steam socket, and that the duct system comprises only one steam inlet. In such a case, it is possible to have one inlet duct connected to the steam inlet, wherein such inlet tube branches off into the subsidiary ducts 32, 33.

In the shown example, the steam is used for pumping the liquid and for heating the liquid. It is also possible that steam is supplied for the sole purpose of heating the liquid. For example, steam may be supplied to the main duct 31 downstream of the joint of the second subsidiary duct 33 to the main duct 31, that does not contribute to the pumping action, but that does increase the temperature of the obtained mixture of liquid and steam. By doing so, the pumping action and the heating function can be optimized separately.

In general, fluid which is supplied to fluid in the main duct 31, and which has a function in heating or cooling the fluid in the main duct 31, may be supplied in at least one subsidiary flow in such a way that a pumping action is obtained, and may be supplied in at least one other subsidiary flow which does not have a pumping effect at all. For example, in the duct system 30 of the beverage making unit 1 according to the first preferred embodiment of the present invention, a supply of steam which only leads to an increase of the temperature of the fluid in the main duct 31 may be realized in the form of a supply of steam through a duct which is at right angles with the main duct 31. The temperature of the beverage to be prepared may be optimized by using one or more of such additional ducts, without influencing the pumping process that takes place in the duct system 30.

It has already been noted that the air duct 34 may be closed by means of the valve 19. In an alternative embodiment of the beverage making unit 1, which is only suitable to be applied for the purpose of making a hot beverage without froth, the air duct 34 may be omitted altogether.

Instead of the valve 19 as shown, other means may be provided for offering a user a choice between a beverage with froth and a beverage without froth. For example, the air inlet 45 may be closed as a standard, wherein the beverage maker 15 comprises means for opening the air inlet 45 if so desired. In a practical embodiment, the air inlet 45 may be closed by a foil, wherein the beverage maker 15 comprises means like a movably arranged pin for piercing the foil.

It is not necessary for the disposable cartridge 10 to be provided with a reservoir 20 containing the liquid to be used in the process of preparing the beverage. It is also possible that the beverage maker 15 comprises such a reservoir, wherein the liquid inlet 42 of the main duct 31 is connectable to the reservoir, and wherein an open communication between the main duct 31 and the reservoir may be established upon receipt of the cartridge 10 in the beverage maker 15. Furthermore, it is possible that an external reservoir is used, which may even be a carton containing the liquid, and that a hose for putting the main duct 31 in communication with the liquid in the external reservoir is applied.

In principle, it is possible to apply a cartridge which is intended for more uses than just a single one. Such a cartridge may be of the same design as the shown disposable cartridge 10. In case the cartridge comprises a reservoir 20, this reservoir 20 is arranged such as to be refillable, or this reservoir 20 comprises a quantity of liquid which is adapted to being used for a predetermined number of uses, wherein the number is more than one. In case the cartridge does not have a reservoir 20, it is up to the user to decide how many times the cartridge will be used before it is thrown away.

The beverage maker 15 may be arranged such as to supply different quantities of beverage, depending on a choice of the user. For example, the user may choose to have a single quantity of beverage or a double quantity of beverage. In such a case, the reservoir 20 of the disposable cartridge 10 may comprise a double quantity of liquid, so that the disposable cartridge 10 is suitable to be used two times for the purpose of preparing a single quantity of beverage or one time for the purpose of preparing a double quantity of beverage.

With respect to the steam generator 16, it is noted that the beverage maker 15 may comprise a refillable water tank for containing water and a water supplying arrangement for supplying water to the steam generator 16 during operation of the beverage maker 15, in any suitable manner known per se. It is also possible that the steam generator 16 is connected to the water mains. It is noted that in case one or more of the fluids used for the purpose of preparing a beverage by applying the beverage making unit 1 comprises water, the relevant inlet or inlets of the duct system 30 of the beverage making unit 1 may also be connected to the water tank or the water mains.

Within the scope of the present invention, it is not necessary to use a disposable cartridge 10 in a process of preparing a beverage, although this way of preparing a beverage has important advantages. One of these advantages is that the applied liquid and the obtained beverage only contact elements of the disposable cartridge 10, so that the beverage maker 15 does not get contaminated. This is especially important in case the liquid is apt to go bad relatively quickly, which is the case when the liquid comprises milk, for example.

It is possible to have a beverage making unit 1 which is fixedly arranged in the beverage maker 15. In such a case, the beverage maker 15 may comprise a refillable reservoir for containing the liquid. According to another possibility, suitable means such as a hose for putting the beverage making unit 1 in communication with liquid in an external reservoir are provided. The beverage maker 15 may also be adapted to receiving disposable reservoirs containing the liquid.

Whether the beverage making unit 1 according to the present invention is fixedly arranged in a beverage maker 15 or not, an important feature of the beverage making unit 1 is that for the purpose of preparing a beverage on the basis of at least two fluids, at least two subsidiary flows containing one of the fluids is supplied to a main flow containing another of the fluids, at different positions. One of the fluids may be a liquid and another of the fluids may be steam, wherein the steam is used to heat the liquid.

The beverage making unit 1 according to the present invention comprises a duct system 30. Within the scope of the present invention, numerous possibilities of the number of ducts of the duct system 30 and the configuration of these ducts exist. The duct system 30 may be designed as the duct system 30 shown in FIGS. 1 and 2, but may also be of a different design. In the following, a number of possible other designs will be explained with reference to FIGS. 3-5. For sake of clarity, directions of flows which are present in the shown duct systems 30 during operation are indicated by means of arrows in the figures.

Figure 3:
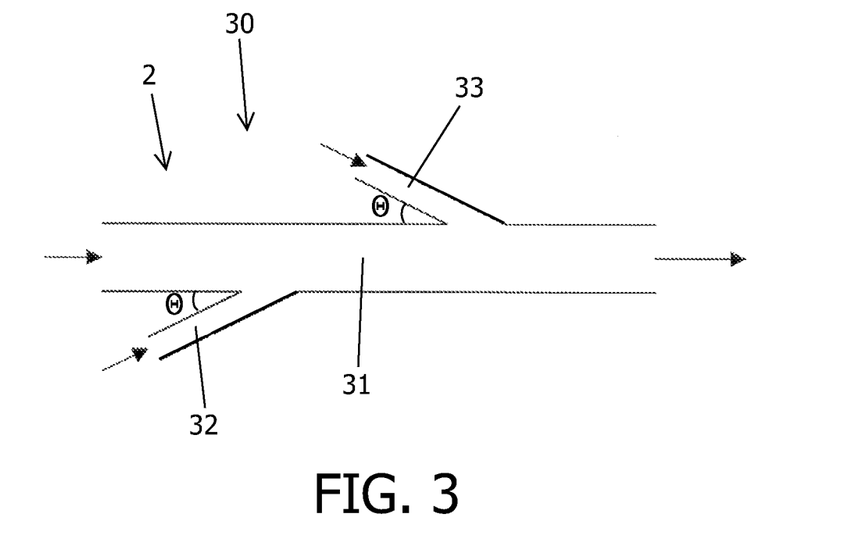
FIG. 3 diagrammatically shows a duct system of a beverage making unit according to a second preferred embodiment of the present invention.

In FIG. 3, a duct system 30 of a beverage making unit 2 according to a second preferred embodiment of the present invention is shown.

Like the duct system 30 of the beverage making unit 1 according to the first preferred embodiment of the present invention, the duct system 30 of the beverage making unit 2 according to the second preferred embodiment of the present invention comprises a main duct 31, a first subsidiary duct 32 and a second subsidiary duct 33. The main duct 31 is adapted to supplying a first fluid and to receiving a second fluid, wherein both subsidiary ducts 32, 33 are adapted to supplying the second fluid, and are arranged such as to merge into the main duct 31.

It is noted that, although this is not shown in FIG. 3, it is possible to have one or more inlets for letting in air arranged in one of the main duct 31, the first subsidiary duct 32 and the second subsidiary duct 33. In such a case, it is possible to supply air for the purpose of forming froth. Furthermore, it is possible for the duct system 30 to comprise more than two subsidiary ducts 32, 33 for supplying the second fluid.

In a direction in which the flows take place during operation, an angle θ between a longitudinal axis of the main duct 31 and a longitudinal axis of each of the subsidiary ducts 32, 33 is smaller than 90°, in an order of about 25° to 30°.

The first fluid may be a liquid such as milk or coffee and the second fluid may be steam. During operation of the beverage making unit 2, the second fluid acts like a pumping fluid. When the second fluid is supplied from the first subsidiary duct 32, a local underpressure is created, due to a transfer of momentum from the flow of the second fluid to the first fluid. Under the influence of the local underpressure, a flow of the first fluid is generated in the main duct 31. At a joint of the second subsidiary duct 33 to the main duct 31, a second pumping action is obtained in a similar manner. Eventually, a flow of the first fluid and the second fluid is obtained. In the process, it is possible that the fluids are initially at different temperatures, and that one of the fluids is used to heat another of the fluids.

An important feature of the duct system 30 of the beverage making unit 2 according to the second preferred embodiment of the present invention is that the subsidiary ducts 32, 33 merge into the main duct 31 from different sides, in particular from opposite sides. Furthermore, like in the duct system 30 of the beverage making unit 1 according to the first preferred embodiment of the present invention, the subsidiary ducts 32, 33 merge into the main duct 31 at different positions along the longitudinal axis of the main duct 31. In this way, the improving effect of the presence of at least two subsidiary ducts 32, 33 on the mixing process of the first fluid and the second fluid is even further enhanced.

Within the scope of the present invention, it is possible to have a duct system 30 in which the subsidiary ducts 32, 33 merge into the main duct 31 at one and the same position along the longitudinal axis of the main duct 31, wherein the subsidiary ducts 32, 33 merge into the main duct 31 from different sides. However, in order to realize a gradual supply of the second fluid to the first fluid, it is preferred to have a design of the duct system 30 in which the subsidiary ducts 32, 33 merge into the main duct 31 at different positions along the longitudinal axis of the main duct 31, especially in case a cross-sectional area of the main duct 31 has relatively small dimensions.

Figure 4:
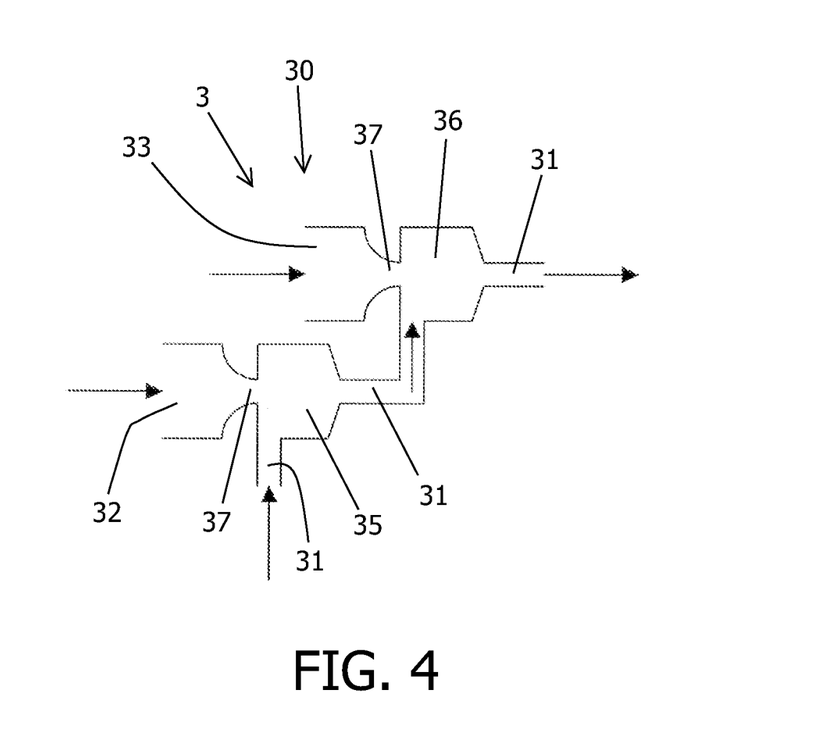
FIG. 4 diagrammatically shows a duct system of a beverage making unit according to a third preferred embodiment of the present invention.

In FIG. 4, a duct system 30 of a beverage making unit 3 according to a third preferred embodiment of the present invention is shown.

Like the duct system 30 of the beverage making unit 2 according to the second preferred embodiment of the present invention, the duct system 30 of the beverage making unit 3 according to the third preferred embodiment of the present invention comprises a main duct 31, a first subsidiary duct 32 and a second subsidiary duct 33. The main duct 31 is adapted to supplying a first fluid and to receiving a second fluid, wherein both subsidiary ducts 32, 33 are adapted to supplying the second fluid, and are arranged such as to merge into the main duct 31.

It is noted that, although this is not shown in FIG. 4, it is possible to have one or more inlets for letting in air arranged in one of the main duct 31, the first subsidiary duct 32 and the second subsidiary duct 33. In such a case, it is possible to supply air for the purpose of forming froth. Furthermore, it is possible for the duct system 30 to comprise more than two subsidiary ducts 32, 33 for supplying the second fluid.

The main duct 31 comprises two widened portions 35, 36 at the positions where the subsidiary ducts 32, 33 merge into the main duct 31, which will hereinafter be referred to as first chamber 35 and second chamber 36. An end portion 37 of the subsidiary ducts 32, 33, which is connected to the main duct 31, is restricted. Hence, the duct system 30 is adapted to letting flows of the second fluid perform a pumping action of the first fluid, so that it is not necessary to have a separate pump for pumping the first fluid. In particular, the duct system is adapted to letting flows of the second fluid perform a pumping action of the first fluid on the basis of the venturi principle, according to which a first fluid is sucked in a chamber under the influence of a local underpressure that is obtained by successively conducting a second fluid through a restriction and supplying this second fluid to the chamber.

During operation of the beverage making unit 3 according to the third preferred embodiment of the present invention, the second fluid is applied for the purpose of pumping the first fluid, wherein a flow of the first fluid is obtained under the influence of the flows of the second fluid. In particular, in the first subsidiary duct 32, the second fluid is pressurized by the restricted end portion 37 before the second fluid enters the first chamber 35. In the first chamber 35, an underpressure is created, under the influence of which the first fluid is pumped into the first chamber 35. Furthermore, in the first chamber 35, the first fluid and the second fluid are mixed. Also, in case the fluids are initially at different temperatures, a transfer of heat from the fluid at the higher temperature to the fluid at the lower temperature takes place in the first chamber 35.

At an upstream position, in the second subsidiary duct 33, the second fluid is pressurized by the restricted end portion 37 before the second fluid enters the second chamber 36. In the second chamber 36, an underpressure is created, under the influence of which the fluid mixture that is obtained in the first chamber 35 is pumped into the second chamber 36. Furthermore, in the second chamber 36, the second fluid supplied by the second subsidiary duct 33 is added to the mixture, and another mixture of the first fluid and the second fluid is obtained. Also, in case the fluids are initially at different temperatures, a transfer of heat from the fluid at the higher temperature to the fluid at the lower temperature takes place in the second chamber 36.

For sake of completeness, it is noted that in order to obtain an effective pumping action of the flows of the second fluid on the flow of the first fluid in the main duct 31, the flows of the second fluid are supplied at an angle of 90° with respect to the flow of the first fluid.

The pumping process is performed in two steps, wherein a first step takes place at a joint of the first subsidiary duct 32 to the main duct 31, under the influence of the flow of the second fluid supplied by the first subsidiary duct 32, and wherein a second step takes place at a joint of the second subsidiary duct 33 to the main duct 31, under the influence of the flow of the second fluid supplied by the second subsidiary duct 33.

An advantage of supplying the second fluid in two portions is that better and faster mixing of the first fluid and the second fluid is achieved. Moreover, in case the second fluid has a function in heating the first fluid, the temperature of the first fluid is gradually increased, wherein it is possible to put the first fluid to a temperature that is close to its boiling temperature, without any risk of local boiling of the first fluid.

In the shown example, the main duct 31 is curved, as a result of which the mixing process and the heat transfer process are improved. Nevertheless, the main duct 31 may also be straight.

The duct system 30 of the beverage making unit 1 according to the first preferred embodiment of the present invention may be regarded as two ejector pumps arranged in series, wherein each ejector pump comprises a main duct 31 and a subsidiary duct 32, 33 merging into the main duct 31. The same applies to the duct system 30 of the beverage making unit 2 according to the second preferred embodiment of the present invention. Likewise, the duct system 30 of the beverage making unit 3 according to the third preferred embodiment of the present invention may be regarded as two venturi pumps arranged in series, wherein each venturi pump comprises a main duct 31 and a subsidiary duct 32, 33 merging into the main duct 31. It has already been noted that the duct system 30 may comprise more than two subsidiary ducts 32, 33. In other words, more than two fluid pumps arranged in series may be applied, wherein the subsidiary ducts 32, 33 of the fluid pumps are used for supplying the same fluid. The fluid pumps may be of the same type, but this is not necessary. For example, a duct system 30 comprising an ejector pump and a venturi pump, wherein the subsidiary ducts 32, 33 are used for supplying the same fluid, is within the scope of the present invention.

Figure 5:
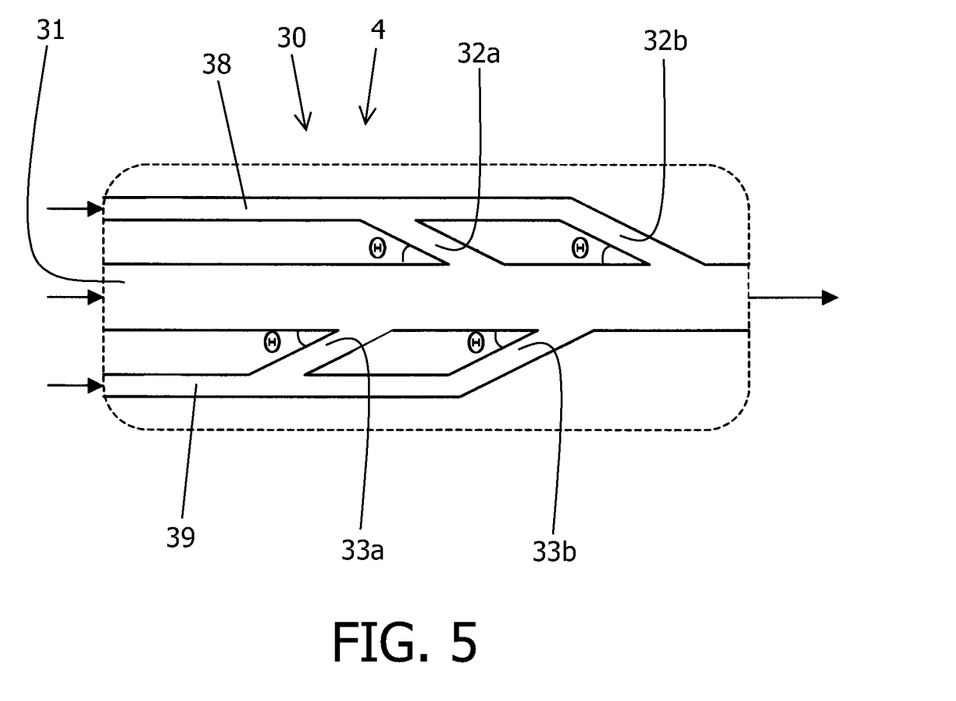
FIG. 5 diagrammatically shows a duct system of a beverage making unit according to a fourth preferred embodiment of the present invention.

In FIG. 5, a duct system 30 of a beverage making unit 4 according to a fourth preferred embodiment of the present invention is shown. This duct system 30 comprises a main duct 31, two supply ducts 38, 39, and two pairs of subsidiary ducts 32a, 32b, 33a, 33b, wherein each pair of subsidiary ducts 32a, 32b, 33a, 33b is formed like two branches of a supply duct 38, 39, and wherein all subsidiary ducts 32a, 32b, 33a, 33b merge into the main duct 31. In the shown example, the supply ducts 38, 39 extend at opposite sides of the main duct 31, and the pairs of subsidiary ducts 32a, 32b, 33a, 33b are arranged at opposite sides of the main duct 31 as well. Furthermore, the various subsidiary ducts 32a, 32b, 33a, 33b merge into the main duct 31 at different positions along the longitudinal axis of the main duct 31.

Within the scope of the present invention, the number of subsidiary ducts 32a, 32b, 33a, 33b associated with one supply duct 38, 39 may be more than two, and the number of supply ducts 38, 39 having at least two branches (subsidiary ducts 32a, 32b, 33a, 33b) may be more than two as well. It is preferred if subsidiary ducts 32a, 32b, 33a, 33b associated with different supply ducts 38, 39 merge into the main duct 31 at different sides of the main duct 31, but this is not necessary within the scope of the present invention.

The main duct 31 is adapted to supplying a fluid and to receiving one or more other fluids from the supply ducts 38, 39, through the subsidiary ducts 32a, 32b, 33a, 33b. Both supply ducts 38, 39 are adapted to supplying a fluid, wherein the supply ducts 38, 39 may be applied for the purpose of conveying different fluids, or for the purpose of conveying the same fluid. For example, the main duct 31 is applied for supplying a liquid such as milk, whether concentrated or not, and both supply ducts 38, 39 are applied for supplying steam. In such a case, during operation of the beverage making unit 4, the steam is supplied to the main duct 31 at four places, through the two pairs of subsidiary ducts 32a, 32b, 33a, 33b. In the process, due to the configuration of the subsidiary ducts 32a, 32b, 33a, 33b, the steam is supplied in portions, at different positions on the main duct 31, and the risk of local boiling of the liquid is reduced, while the mixing process of the liquid and the steam is enhanced.

Besides the shown ducts 31, 32a, 32b, 33a, 33b, 38, 39, the duct system 30 of the beverage making unit 4 may also comprise at least one air duct for letting in air to at least one of these other ducts 31, 32a, 32b, 33a, 33b, 38, 39 of the duct system 30, so as to obtain froth.

The duct system 30 of the beverage making unit 4 according to a fourth preferred embodiment of the present invention is adapted to letting the flows of fluid supplied by the subsidiary ducts 32a, 32b, 33a, 33b perform a pumping action on the flow of fluid supplied by the main duct 31 according to the ejector principle. To this end, among other things, the subsidiary ducts 32a, 32b, 33a, 33b extend at an angle θ with respect to the main duct 31, which is considerably smaller than 90°. Within the scope of the present invention, it is also possible to have a duct system 30 comprising a main duct 31, at least two supply ducts 38, 39, and subsidiary ducts 32a, 32b, 33a, 33b extending between the supply ducts 38, 39 and the main duct 31, wherein the design of the various ducts 31, 32a, 32b, 33a, 33b, 38, 39 is adapted to letting the flows of fluid supplied by the subsidiary ducts 32a, 32b, 33a, 33b perform a pumping action on the flow of fluid supplied by the main duct 31 according to the venturi principle.

The beverage making unit 4 is adapted to being applied in a beverage maker, and may be part of a disposable cartridge, for example. In principle, in case both supply ducts 38, 39 are applied for the purpose of conveying the same fluid, the cartridge may be provided with a single inlet for letting in this fluid. However, according to another option, the cartridge comprises two inlets, wherein each inlet is associated with a supply duct 38, 39. The latter option is preferred, as in that case, the cartridge may be of a relatively simple design, wherein the various ducts in the cartridge may be relatively short and have little bends. As a result, the flow resistance of the cartridge may be lower, heat losses may be reduced, and a balanced supply of fluid(s) from the supply ducts 38, 39 to the main duct 31, through the subsidiary ducts 32a, 32b, 33a, 33b, may be realized. Preferably, a beverage maker adapted to receiving a cartridge having one inlet associated with one supply duct 38, and having another inlet associated with another supply duct 39, comprises two outlets which are connectable to these inlets of the cartridge.

The beverage making units 1-4 as disclosed are suitable to be applied in processes of preparing various beverages on the basis of at least two fluids, wherein it does not matter whether these beverages are hot or cold. An important aspect of the present invention is that at least one of the fluids is supplied to another of the fluids in more than one portion, in order to ensure good mixing of the fluids. In a process of preparing a cold beverage, one fluid may be used to cool another fluid. In such a case, it is advantageous that a good mixture of the fluids is obtained. In case one fluid also has a function in heating another fluid for the purpose of preparing a hot beverage, it is achieved that the fluid which is initially colder than the other fluid is gradually heated up, wherein it is possible to heat the fluid to a temperature that is close to its boiling temperature, without any risk of local boiling of the fluid.

Like the main duct 31 of the duct system 30 of the beverage making unit 3 according to the third preferred embodiment of the present invention, the main duct 31 of the duct system 30 of the other shown beverage making units 1, 2, 4 may be curved. An advantage of a curved shape of the main duct 31 is that mixing processes and heat transfer processes which take place in the main duct 31 are improved.

In the duct system 30 of the beverage making unit 1-4, an inlet may be arranged for letting in a dry substance such as cacao powder to the duct system 30. In such a case, the process of preparing a beverage also involves adding the dry substance.

It will be clear to a person skilled in the art that the scope of the present invention is not limited to the examples discussed in the foregoing, but that several amendments and modifications thereof are possible without deviating from the scope of the present invention as defined in the attached claims.

In the foregoing, among other things, a disposable cartridge 10 is disclosed, which is suitable to be used in a process of preparing a beverage. The disposable cartridge 10 comprises a beverage making unit 1 for conveying and mixing at least two fluids. The beverage making unit 1 comprises a duct system 30 having a main duct 31, a first subsidiary duct 32 which merges into the main duct 31, and a second subsidiary duct 33 which merges into the main duct 31 as well, at a different position than the first subsidiary duct 32. In a process of preparing a beverage, a first fluid is supplied by the main duct 31, and flows of a second fluid are supplied by the subsidiary ducts 32, 33. In this way, it is achieved that the second fluid is mixed with the first fluid in two steps. In case the second fluid is used for heating the first fluid, local boiling of the first fluid is prevented.

The invention claimed is:

1. A beverage making unit for use in a beverage maker, comprising a duct system for conveying at least two fluids toward a outlet of the beverage maker and for joining the fluids in order to prepare a beverage, wherein said duct system comprises:
   a main duct for carrying a main flow of a first of said at least o fluids, said main duct having an inlet at one longitudinal end thereof for receiving the first of said at least two fluid; and
   at least two subsidiary ducts for carrying subsidiary flows of a second of said at least two fluids, said at least two subsidiary ducts merging into the main duct at different positions along a longitudinal axis of the main duct between the inlet and an outlet of the main duct, said at least two subsidiary ducts each having a cross sectional area smaller than a cross-sectional area of the main duct, wherein a longitudina axis of at least one of the subsidiary ducts extends at an angle smaller than 90° with respect to the longitudinal axis of the main duct at a position where the corresponding subsidiary duct merges into the main duct, wherein the subsidiary flows carried by he at least one of the subsidiary ducts that extends at an angle smaller than 90° and containing the second of said at least two fluids performs a pumping action on a main flow containing the first of said at least two fluids.

2. The beverage making unit as claimed in claim 1, wherein the inlet of the main duct is connectable to a supplying arrangement for supplying the first of said at least two fluids, and wherein said second of said at least two fluids is steam, and inlets of the at least two subsidiary ducts are connectable to a supplying arrangement for supplying steam.

3. The beverage making unit as claimed in claim 1, wherein the duct system further comprises at least one supply duct connected to inlets of said at least two subsidiary ducts.

4. The beverage making unit as claimed in claim 3, wherein the inlet of the main duct is connectable to a supplying arrangement for supplying the first of said at least two fluids, and wherein said second of said at least two fluids is steam, and an inlet of the supply duct is connectable to a supplying arrangement for supplying steam.

5. The beverage making unit as claimed in claim 1, wherein the duct system further comprises an air duct merging into one of tie main duct and the at least two subsidiary ducts of the duct system.

* * * * *